United States Patent Office 2,856,393
Patented Oct. 14, 1958

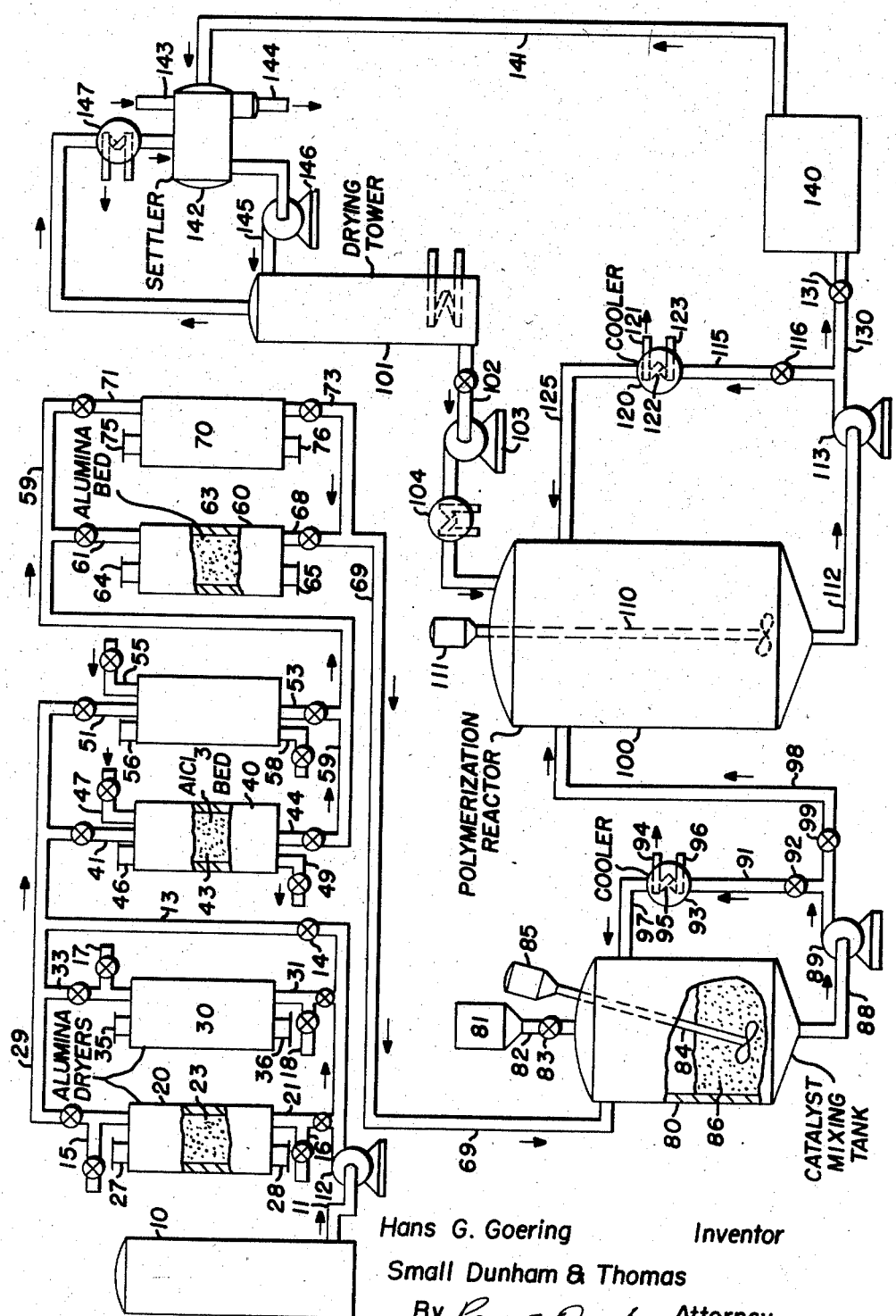

2,856,393

PROCESS FOR PURIFICATION OF POLYMERIZATION DILUENTS

Hans G. Goering, Elizabeth, N. J., assignor to Esso Research and Engineering Company, a corporation of Delaware Application August 9, 1955, Serial No. 527,205

11 Claims. (Cl. 260—94.8)

This invention relates to polymerization and more particularly relates to an improved process for the preparation of monoolefin polymers. Still more particularly, the present invention concerns the pretreatment of the hydrocarbon diluent, such as commercial hexane, which is employed in the process of polymerizing isobutylene.

The polymerization of monoolefins is well known in the art. Polymers of isobutylene have been found to be particularly useful in a wide variety of commercial applications. Isobutylene polymers having a Staudinger molecular weight in the range of about 500 to 50,000 have been used extensively as wax and lubricating oil additives, oil thickeners, adhesives, cements, sealing and caulking compounds, etc. In particular, polymers of isobutylene having a molecular weight in the range of about 5,000 to 25,000 have been widely employed as useful lubricating oil additives. Isobutylene polymers of this molecular weight when added to lubricating oil compositions serve as viscosity index improvers and thickeners in the lubricating oil compositions.

Polyisobutylenes having a molecular weight of about 500 to 50,000 and higher have been prepared heretofore employing a Friedel-Crafts catalyst to effect the polymerization of isobutylene. Conventionally, the polymerization of isobutylene is carried out in the presence of an inert diluent such as n-butane, methyl chloride, carbon dioxide, isopentane, n-pentane, isohexane, cyclohexane, n-hexane, etc. Aromatics such as benzene, toluene, etc. have been employed as diluents but generally are avoided due to their tendency to alkylate with the reacting olefins and/or form complexes with the catalyst. It has been found that the polymerization of isobutylene can be most effectively carried out on a commercial scale employing finely divided aluminum chloride as a polymerization catalyst and commercial hexane as an inert diluent in the process. The use of aluminum chloride as a catalyst is simpler and considerably less expensive than the use of other Friedel-Crafts catalysts such as boron trifluoride (a gas) or aluminum bromide. Also, the use of a hydrocarbon diluent such as commercial hexane is superior to other diluents such as methyl chloride; for example, halogenated hydrocarbon solvents are relatively expensive and subject to hydrolysis. The latter complicates the fractionation and recovery steps subsequent to polymerization. Commercial hexane is not subject to such hydrolysis problems.

Although the preparation of polyisobutylene employing aluminum chloride catalyst and commercial hexane as a diluent has had outstanding commercial success, this process has not been entirely free from certain process difficulties. In general, the polymerization of isobutylene in this process is carried out by initially admixing the aluminum chloride catalyst and the commercial hexane to form a catalyst slurry. Then the catalyst slurry and isobutylene (and recycle commercial hexane) are admixed in a polymerization zone to effect the polymerization of the isobutylene. In carrying out this process, it has been found that a certain amount of sludge has been formed in the lines, valves and meters between the zone wherein the aluminum chloride catalyst is admixed with the commercial hexane diluent and the polymerization zone. This sludge, which is a sticky viscous material (insoluble in hexane), has caused plugging of lines, valves and meters in the most extreme cases. At other times the sludge has accumulated in the lines, valves and meters to such an extent as to give uneven flow of the catalyst to the polymerization zone, thus resulting in process fluctuations which in turn produced a non-uniform polymeric product and a product having a relatively wide molecular weight spread. In addition the activity of the aluminum chloride catalyst was found to be reduced, making it difficult to obtain desired high molecular weight polymers. In the polymerization of isobutylene, it is of course desired to make a uniform and specification product of high quality. A polymeric product which contains polymers having a relatively wide range of molecular weights is less desirable as a lubricating oil additive.

It has now been found that in the process of preparing polyisobutylenes having a molecular weight in the range of about 500 to 50,000 wherein finely divided aluminum chloride is employed as a catalyst and commercial hexane is employed as a diluent, the aforementioned difficulties may be eliminated or substantially reduced by passing the commercial hexane, prior to admixture with the finely divided aluminum chloride catalyst, through a bed of relatively coarse particles of aluminum chloride. An outstanding improvement has been obtained when the commercial hexane, prior to admixture with the aluminum chloride catalyst, is also passed through a bed of relatively coarse particles of alumina. Thus more particularly in the preferred embodiment of this invention, the commercial hexane is passed initially through a bed of relatively coarse particles of aluminum chloride and then through a bed of relatively coarse particles of alumina. It has been found that the improved method of this invention substantially eliminates the formation of the aforementioned sludging difficulties and resulting process difficulties and promotes the formation of a uniform high molecular weight polyisobutylene product.

The improved method of this invention will be better understood by reference to the attached figure which is a flow plan of the preferred embodiment of the present invention. Referring now to the figure, reference character 10 designates a storage tank containing commercial hexane which is employed as a diluent in the method of the present invention. Commercial hexane, which boils within the range of about 150° to 160° F., is generally obtained as a narrow cut from casinghead gasoline or from a virgin naphtha by distillation. Generally, the commercial hexanes available on the market have the following approximate composition:

| Component: | Volume percent |
|---|---|
| n-Hexane | 25–70 |
| Iso-hexanes | 5–35 |
| Benzene | 1–10 |
| $C_6$ cycloaliphatics | 10–60 |
| $C_6$ olefins | 0.1–3.0 |
| Iso-heptanes | 5–20 |

The exact composition of a particular commercial hexane will depend upon (1) the crude oil source and (2) the degree of fractionation employed. It will be understood, however, that in general the commercial hexanes on the market have the above approximate composition and that such commercial hexanes may be employed in the present invention. The commercial hexane will also contain traces of water in the range of about 30 to 300 parts per million.

In accordance with the present invention, a hydrocarbon diluent such as commercial hexane in tank 10 is pumped through line 11 by means of pump 12 to either one or both of dryers 20 and 30. These dryers contain beds of a desiccant, such as alumina gel, having a particle size in the range of about 4 to 20 mesh. The function of dryers 20 and 30 is to remove the traces of water present in the commercial hexane. This drying step is conventional in the polymerization process of isobutylene. More specifically, the commercial hexane from tank 10 may be pumped through lines 11 and 21 into dryer 20 containing bed 23 of alumina gel. The dried commercial hexane from bed 23 of dryer 20 is then passed into line 29. Dryer 20 is provided with ports 27 and 28 located respectively on the top and bottom of dryer 20 so that fresh alumina gel may be charged to dryer 20 through port 27 and after the alumina gel has become exhausted as a drying medium may be removed from dryer 20 through port 28.

Simultaneously or alternatively to the passage of the commercial hexane through dryer 20, the commercial hexane is passed into dryer 30 through lines 11 and 31 and removed from the bed of alumina gel in dryer 30 through lines 33 and 29. Dryer 30 is provided with port 35 for introducing fresh alumina gel thereto and port 36 for withdrawing exhausted alumina gel therefrom. Although the flow of the commercial hexane through dryers 20 and 30 as shown in the figure is upward, it will be understood that if desired the flow through the dryers may be downward also by changing the piping arrangement therefor. It will also be understood that only one dryer need be employed but that it is preferred to have two because in such case the commercial hexane may be dried continuously by employing dryers 20 and 30 on an alternating basis. It will be further understood that the commercial hexane may be passed continuously through dryer 20 and/or dryer 30 either on a continuous or intermittent basis. Rates of about 1 to 100, preferably 4 to 20, v./v./hour (volume of commercial liquid hexane per volume of alumina gel per hour) may be employed in general. Drying temperatures of about 40 to 200° F., preferably about 70 to 120° F., may be employed. If desired when employing relatively dry commercial hexanes, the dryers may be by-passed through line 13 by opening valve 14. Also, if desired the water taken up by the alumina beds in dryers 20 and 30 may be removed (i. e., the dryers may be regenerated) by passing hot hydrocarbon vapors, e. g., ethane, at 350° to 500° F. through the beds when they are not being employed to dry the commercial hexane. Dryer 20 may thus be regenerated by passing ethane at 400° F. through lines 15 and 16 and dryer 30 similarly using lines 17 and 18.

In accordance with the present invention the dried commercial hexane is next passed through a bed of relatively coarse particles of aluminum chloride. This is accomplished as shown in the figure by passing the dried commercial hexane through column 40 and/or 50, each of which contains a bed of relatively coarse particles of aluminum chloride. More particularly, the dried commercial hexane may be passed through lines 29 and 41 downwardly through column 40 containing bed 43 of aluminum chloride particles. The aluminum chloride treated commercial hexane is withdrawn from column 40 through lines 44 and 59. Simultaneously or alternatively to the passage of the commercial hexane through column 40, the commercial hexane may also be passed downwardly through column 50 through lines 29 and 51. The aluminum chloride treated commercial hexane is withdrawn from column 50 through lines 53 and 59.

Column 40 is provided with port 46 which may be employed to charge fresh aluminum chloride to column 40. Similarly, column 50 is provided with port 56 for charging fresh aluminum chloride to column 50. Upon exhaustion of the aluminum chloride, that is, when the aluminum chloride loses its effectiveness to prevent the formation of sludge in the process, the aluminum chloride in the beds is conveniently removed by flushing colums 40 and 50 with water. The aluminum chloride is soluble in the acidic water and thus may be conveniently removed from columns 40 and 50. In accordance with this procedure, column 40 is provided with line 47 whereby water may be passed into column 40. The resultant wash solution is removed from column 40 by means of line 49. Similarly, wash water may be introduced into column 50 through line 55 and the resultant wash water may be removed from column 50 through line 58.

It will be understood that tower 40 and tower 50 may be employed simultaneously or alternatively in this process. The alternative utilization of towers 40 and 50 is preferred since this permits a continuous process in that one of the columns may be employed for treating while the aluminum chloride bed of the other is being replaced. It will also be understood that the flow of commercial hexane through towers 40 and 50 may be either in an upward or a downward direction, as desired. Further, it will be understood that the flow of the commercial hexane through columns 40 and 50 may be either on a continuous or intermittent basis, as desired.

Treating rates of about 1 to 50 v./v./hour (volume of commercial hexane per volume of aluminum chloride per hour), preferably about 3 to 15 v./v./hour, may be employed in the process. Treating temperatures in the range of about 0° to 200° F., preferably about 75° to 100° F., may be employed. About 50 to 500 gallons of commercial hexane may be passed through the aluminum chloride beds in columns 40 and 50 per pound of aluminum chloride before it is necessary to replace the aluminum chloride beds. Preferably the capacity of the aluminum chloride beds is maintained in the range of about 75 to 200 gallons of commercial hexane per pound of aluminum chloride. Capacities of less than 50 gallons of commercial hexane per pound of aluminum chloride are very effective from a treating standpoint but are relatively uneconomical. Capacities in excess of about 500 gallons of commercial hexane per pound of aluminum chloride are to be avoided in general due to the substantially reduced effectiveness of the aluminum chloride treatment. The particles of aluminum chloride in columns 40 and 50 are preferably of a size in the range of about 2 to 20 mesh, more preferably about 4 to 8 mesh.

In accordance with the preferred embodiment of this invention, the aluminum chloride treated commercial hexane is then passed through a bed of relatively coarse particles of alumina, preferably activated alumina. More particularly, the aluminum chloride treated commercial hexane is passed through columns 60 and/or 70. Thus the aluminum chloride treated commercial hexane may be passed through lines 59 and 61 into column 60 and through bed 63 of alumina contained in column 60. The resultant alumina-filtered commercial hexane is then withdrawn from column 60 through lines 68 and 69. Column 60 is provided with port 64 which may be employed to charge fresh alumina to column 60 and with port 65 which may be employed to withdraw exhausted alumina therefrom. Simultaneously or alternatively to the passage of the commercial hexane through column 60, the commercial hexane may be passed through column 70 which also contains a bed of relatively coarse particles of alumina. This may be accomplished by passing the commercial hexane through lines 59 and 71 downward through the bed of alumina contained in column 70. The alumina-filtered commercial hexane is then removed from column 70 through lines 73 and 69. Column 70 is provided with port 75 which is employed to charge fresh alumina to column 70 and with port 76 which is employed to remove exhausted alumina therefrom. It will again be understood that column 60 and column 70 can be used on either a simultaneous or alternative treating basis. Likewise it will be understood that the commercial hexane may be passed either upward or downward through the bed of alumina, as desired (by changing the piping arrangement), and it will also be understood that the commercial hexane may be passed either continuously or intermittently through columns 60 and 70. Finally, it will be understood that other similar porous materials may be used in place of the alumina filtering medium; alumina however is particularly preferred.

Treating rates in the range of about 1 to 50 v./v./hour (volume of commercial hexane per volume of alumina per hour), preferably about 3 to 15 v./v./hour, may be employed. Treating temperatures in the range of about 0° to 200° F., preferably about 75° to 100° F., may be employed. In general, the bed of alumina will be replaced after about 50 to 1,000 gallons of commercial hexane have been passed through the alumina bed per pound of alumina. Preferably alumina bed capacities in the range of about 100 to 300 gallons of commercial hexane per pound of alumina are employed. Treating capacities of less than 50 gallons of commercial hexane per pound of alumina may be employed if desired but are in general uneconomical. The effectiveness of the alumina above a capacity of about 1,000 gallons of commercial hexane per pound of alumina is such that process difficulties resulting from sludging and the like are substantially increased. The particle size of the alumina in the beds and columns 60 and 70 should generally be in the range of about 2 to 20 mesh, preferably about 4 to 8 mesh.

The dried, aluminum chloride treated, alumina treated commercial hexane is then passed through line 69 into catalyst mixing tank 80 wherein the treated commercial hexane is admixed with the finely divided aluminum chloride catalyst which is to be used in the polymerization reaction. The aluminum chloride catalyst employed in the process is in dry powder form, having a particle size generally in the range of about 20 to 100 mesh, preferably about 20 to 40 mesh. The finely divided aluminum chloride catalyst is stored in hopper 81 and is introduced into tank 80 through line 82 by opening valve 83 therein. Tank 80 is provided with stirrer 84 which is driven by motor 85 which maintains the finely divided aluminum chloride catalyst in suspension in the commercial hexane slurry medium. Generally, the resultant aluminum chloride-commercial hexane slurry 86 will contain about 0.5 to 20 weight percent, preferably about 1 to 4 weight percent, of aluminum chloride based on total slurry. Catalyst slurry 86 is removed from tank 80 through line 88 by means of pump 89 preferably continuously. Preferably, a portion of catalyst slurry 86 is passed continuously through line 91 by opening valve 92 therein through cooler 93 and is then circulated through line 97 back to tank 80. Cooler 93 is provided with line 96 for introducing a coolant such as liquid ammonia or propane or a chilled brine solution into cooling coil 95, the coolant being removed by means of line 94. By recycling a portion of slurry 86, the temperature of the slurry is reduced to and maintained at a temperature in the range of about —40 to 60° F., preferably about —20 to 0° F.

The remainder of catalyst slurry 86 (which has been cooled) is passed through line 98 preferably continuously by opening valve 99 therein. The cooled catalyst slurry is thus passed through line 98 into polymerization reactor 100. Dry isobutylene (dissolved in recycle commercial hexane) which is to be polymerized in reactor 100 is passed from tower 101 (hereinafter described in further detail) and is then passed through cooler 104 into reactor 100 through line 102 by means of pump 103. Reactor 100 is provided with stirrer 110 which is operated by motor 111. In reactor 100, the catalyst slurry and the isobutylene are admixed by means of stirrer 110 to effect the polymerization of the isobutylene. The reaction may be carried out by batch or continuous process, as desired. The resultant reaction mixture in reactor 100 is withdrawn preferably continuously therefrom through line 112 by means of pump 113. A portion of the reaction mixture is passed through line 115 by opening valve 116 therein. This portion of the reaction mixture is circulated through cooler 120 and thereafter through line 125 back to reactor 100. A coolant is introduced into cooler 120 entering through line 121 passing through cooling coil 122 and removed therefrom by means of line 123. A coolant such as liquid ammonia, propane or ethane, usually the same as employed for cooling the catalyst slurry, may be employed. Cooler 120 is employed to cool the aforementioned circulating reactor stream to thereby maintain the polymerization temperature in reactor 100 at the desired level.

The remainder of the reaction mixture withdrawn from reactor 100 through line 112 is passed through line 130 by opening valve 131 therein. This portion of the reaction mixture is passed through line 130 to separation and recovery equipment 140 wherein the resultant polymer product is recovered from the remainder of the reaction mixture and wherein unreacted isobutylene, the commercial hexane diluent and the aluminum chloride catalyst complexes and residues are separated from the reaction product. A number of conventional separation techniques may be employed. In the drawing the reaction mixture in line 130 is passed to recovery and separation apparatus 140 wherein the polymer product is separated from the other components of the reaction mixture. In apparatus 140 the commercial hexane diluent and unreacted isobutylene are flashed overhead from the reaction mixture in a flashing tower and are then passed through line 141 to settler 142. Fresh isobutylene is also passed to settler 142 through line 143. Water settling out in settler 142 is removed through line 144. The hydrocarbons (commercial hexane and isobutylene) containing traces of water are passed from settler 142 to azeotropic drying tower 101 through line 145 by means of pump 146. The dried hydrocarbon product is withdrawn from the bottom of tower 101 through line 102 and passed through cooler 104 to reactor 100. An overhead stream is withdrawn from tower 100 and condensed in condenser 147 and passed to settler 142 for separating water from the hydrocarbons as described heretofore. It will be understood that all of the commercial hexane (including that used to slurry the catalyst as well as that in the recycle stream) employed in the present polymerization process is preferably pretreated by passing it through the bed of aluminum chloride.

The polymerization reaction carried out in reactor 100 will generally require reaction temperatures in the range of about —50 to 50° F. Preferred reaction temperatures are in the range of about 10 to —30° F. In general, reactor residence times in the range of about 0.2 to 4 hours will be employed. Usually reactor residence times of about 0.5 to 2 hours will be employed. In general, the proportion of hydrocarbon diluent to isobutylene which will be employed will be in the range of about 50–75% by weight of the hydrocarbon diluent and 25–50% by weight of isobutylene. Preferred proportions on a weight basis are about 60–70% hydrocarbon diluent and 30–40% of isobutylene. Generally the isobutylene employed will be of about 98% purity (i. e., 98 weight percent isobutylene and 2% of hydrocarbons having boiling points near the isobutylene). It will be understood, of course, that it is preferred to use isobutylene of high purity but that butylene fractions containing lesser amounts of isobutylene may be employed in the present process if desired. The reaction conditions may be varied to produce isobutylene polymers having molecular weights from about 500 to 50,000. In general, the present process will be employed to produce isobutylene polymers having molecular weights from about 5,000 to 25,000, more particularly about 15,000 to 20,000, which latter isobutylene polymers are particularly useful as viscosity improvers for lubricating oil compositions. The final reaction mixture produced in reactor 100 will comprise about 10 to 35 weight percent of polyisobutylene, about 2 to 20% of unreacted isobutylene, about 50 to 75% of hydrocarbon diluent such as commercial hexane and about 0.04 to 0.8% of aluminum chloride catalyst, the percentages being expressed on a weight basis.

A specific example of the improved method of the present invention will now be described in detail. The commercial hexane employed in this example has the following approximate composition:

| Component: | Volume percent |
| --- | --- |
| n-Hexane | 44 |
| Iso-hexanes and -heptanes | 30 |
| Benzene | 5.5 |
| $C_6$ cycloaliphatics | 20 |
| $C_6$ olefins | 0.5 |

This commercial hexane is derived from a light virgin naphtha and has a boiling range of about 150 to 160° F. This commercial hexane also contains about 200 parts per million of water. About 1300 gallons of this commercial hexane are pumped batchwise from tank 10 through bed 23 of dryer 20. The rate of passage of the commercial hexane through bed 23 is about 10 v./v./hour. Bed 23 consists essentially of particles of alumina gel of about 4 mesh. The temperature of the bed is about 75° F. The resultant commercial hexane from dryer 20 contains about 20 parts per million of water.

The dried commercial hexane is then passed through aluminum chloride bed 43 of column 40. The particles of aluminum chloride have a size of about 4 mesh. The rate of passage of the commercial hexane through bed 43 is about 15 v./v./hour and the temperature of the bed is about 80° F. Bed 43 of aluminum chloride is replaced after about 100 gallons of commercial hexane per pound of aluminum chloride have been passed therethrough.

The aluminum chloride treated commercial hexane is then passed into column 60 and through bed 63 of alumina contained therein. The particles of alumina in bed 63 have a size of about 4 mesh. The rate of passage of the commercial hexane through bed 63 is about 10 v./v./hour. The temperature of bed 63 is about 90° F. Bed 63 of alumina is replaced after about 200 gallons of commercial hexane per pound of alumina have passed therethrough.

The resultant dried, aluminum chloride treated, alumina filtered commercial hexane flows intermittently at a rate of about 1300 G. P. H. into mixing tank 80 wherein sufficient finely divided aluminum chloride catalyst is admixed therewith from hopper 81 to form a catalyst slurry containing about 1.5 weight percent of aluminum chloride catalyst. In this example, the aluminum chloride catalyst has a particle size of about 30 mesh. The resultant catalyst slurry is stirred vigorously by means of stirrer 85 and is withdrawn from tank 80 through line 88 at the rate of about 3200 G. P. H. About 3070 G. P. H. of catalyst slurry are passed continuously through cooler 93 and recycled back to tank 80. By this means, the temperature of the catalyst slurry passing through line 88 is maintained at a temperature of about 0° F.

About 130 G. P. H. of catalyst slurry are passed continuously through line 98 into polymerization reactor 100. About 500 G. P. H. of high purity fresh isobutylene (99 weight percent isobutylene) are continuously fed into settler 142. Simultaneously, 1690 G. P. H. of recycle hexane and unreacted isobutylene from separation and recovery apparatus 140 also enter settler 142 (to remove entrained water), the total hydrocarbon phase including feed isobutylene being refluxed to the azeotropic drying tower 101 and then passed to reactor 100. The catalyst slurry and isobutylene and hydrocarbon diluent (commercial hexane) are continuously stirred by means of stirrer 110. About 2200 G. P. H. of the reaction mixture in reactor 100 are continuously withdrawn therefrom through line 130. Of the 32,000 G. P. H. of reaction mixture passing through line 112, about 29,800 G. P. H. thereof are passed through line 115 to cooler 120 and thereafter recycled to reactor 100 through line 125. By this recycle cooling, the temperature in reactor 100 is maintained at about −15° F. The average residence time of the materials in reactor 100 is about 1 hour.

The remainder of the reaction mixture passing through line 112 is withdrawn through line 130 and passed to separation and recovery apparatus 140. This reaction mixture comprises about 18 weight percent of polyisobutylene product having a molecular weight of about 18,000, about 12 weight percent of unreacted isobutylene, about 70 weight percent of commercial hexane and about 0.1 weight percent of aluminum chloride catalyst and these components of the reaction mixture are separated from each other.

The effect of pretreating a commercial hexane with aluminum chloride was evaluated in the laboratory. In one run, the commercial hexane was not pretreated with aluminum chloride. In the second run the commercial hexane was pretreated with aluminum chloride by passing the hexane through a bed of aluminum chloride at ambient temperature and then passing it through a filter. The treated and non-treated commercial hexanes were then individually slurried at −20° C. for 8 hours with powdered aluminum chloride catalyst to form a slurry containing 4 wt. percent of aluminum chloride. Sludge was formed in the first run; none was formed in the second run. Thereafter the powdered aluminum chloride catalyst was separated from the slurries and in each case added to water. The aluminum chloride catalyst from the first run (no pretreating) was only moderately reactive with the water. On the other hand the aluminum chloride from the second run (pretreating) was extremely reactive with water. (It has been found that the activity of aluminum chloride for polymerizing isobutylene correlates with the reactivity of the aluminum chloride with water.)

It has been found that when employing the improved method of the present invention for example as described in the specific example above, the sludging difficulties described heretofore in the application have been essentially eliminated. In addition, the aluminum chloride catalyst has performed more effectively. In addition, the improved process has promoted the formation of a more uniform high molecular weight polyisobutylene product having a narrower molecular weight spread. Furthermore, it has not been necessary to shut down the apparatus to unplug lines, valves, meters and the like. In general, process control has been improved substantially by the method of the present invention.

What is claimed is:

1. In a method of preparing polyisobutylene wherein finely divided aluminum chloride catalyst is admixed with commercial hexane to form a catalyst slurry which is then admixed with isobutylene to thereby effect the polymerization of said isobutylene, the improvement which comprises passing said hexane, prior to admixture with said finely divided aluminum chloride catalyst, through a bed of relatively coarse particles of aluminum chloride and then through a bed of relatively coarse particles of alumina, the particles of aluminum chloride and alumina in said beds having a particle size of about 2 to 20 mesh.

2. In a method of preparing polyisobutylene having a molecular weight in the range of about 500 to 50,000 wherein finely divided aluminum chloride catalyst having a particle size of about 20 to 100 mesh is admixed with commercial hexane boiling within the range of about 150° to 160° F. to form a catalyst slurry containing about 0.5 to 20 wt. percent of aluminum chloride, which catalyst slurry is then admixed with isobutylene to thereby effect the polymerization of said isobutylene, the improvement which comprises passing said commercial hexane, prior to admixture with said finely divided aluminum chloride catalyst, through a bed of relatively coarse particles of aluminum chloride and then through a bed of relatively coarse particles of alumina, the relatively coarse particles of aluminum chloride and alumina in said beds having a particle size of about 4 to 8 mesh.

3. In a method of preparing polyisobutylene having a molecular weight in the range of about 10,000 to 25,000 wherein finely divided aluminum chloride catalyst having a particle size of about 20 to 40 mesh is admixed with commercial hexane boiling within the range of about 150° to 160° F. to form a catalyst slurry containing about 1 to 4 wt. percent of aluminum chloride, which catalyst slurry is then admixed in proportions of about 50 to 75% by weight of commercial hexane and 25 to 50% by weight of isobutylene at a temperature of about −50° to 50° F. for a period of time of about 0.2 to 4 hours to thereby effect the polymerization of said isobutylene, the improvement which comprises passing said commercial hexane, prior to admixture with said finely divided aluminum chloride catalyst, through a bed of relatively coarse particles of aluminum chloride at a rate of about 1 to 50 v./v./hour and at a temperature of about 0° to 200° F. and then through a bed of relatively coarse particles of alumina at a rate of about 1 to 50 v./v./hour and at a temperature of about 0° to 200° F., the relatively coarse particles of aluminum chloride and alumina in said beds having a particle size of about 4 to 8 mesh.

4. Method according to claim 3 wherein said polyisobutylene has a molecular weight in the range of about 15,000 to 20,000.

5. Method according to claim 3 wherein said commercial hexane is passed through said beds at a rate of about 3 to 15 v./v./hour.

6. Method according to claim 3 wherein said commercial hexane is obtained from casinghead gasoline.

7. Method according to claim 3 wherein said commercial hexane is obtained from a light virgin naphtha.

8. Method according to claim 3 wherein said commercial hexane has the following approximate composition:

| Component: | Volume percent |
|---|---|
| n-Hexane | 25–70 |
| Iso-hexanes | 5–35 |
| Benzene | 1–10 |
| $C_6$ cycloaliphatics | 10–60 |
| $C_6$ olefins | 0.1–3.0 |
| Iso-heptanes | 5–20 |

9. Method according to claim 3 wherein said commercial hexane is passed through said beds at a temperature of about 75° to 100° F.

10. Method according to claim 3 wherein said bed of aluminum chloride is replaced after about 50 to 500 gallons of said commercial hexane have been passed therethrough.

11. Method according to claim 3 wherein the commercial hexane is dried, prior to its passage through said bed of aluminum chloride, by passing it through a bed of alumina gel.

References Cited in the file of this patent

UNITED STATES PATENTS

| 2,257,086 | Atwell | Sept. 30, 1941 |
| 2,645,601 | Frey | July 14, 1953 |
| 2,739,143 | Goering | Mar. 20, 1956 |